United States Patent
Gebhardt et al.

(10) Patent No.: US 12,103,783 B2
(45) Date of Patent: Oct. 1, 2024

(54) CONVEYING CARRIAGE FOR A DISTRIBUTING CONVEYOR AND CONNECTING ARRANGEMENT FOR FASTENING A CONVEYING CARRIAGE TO A DRIVE MEANS OF A DISTRIBUTING CONVEYOR

(71) Applicants: Gebhardt Foerdertechnik GmbH, Sinsheim (DE); Koerber Supply Chain GmbH, Bad Nauheim (DE)

(72) Inventors: Marco Gebhardt, Sinsheim (DE); Halit Demir, Sinsheim (DE)

(73) Assignees: Gebhardt Foerdertechnik GmbH, Sinsheim (DE); Koerber Supply Chain GmbH, Bad Nauheim (DE)

( * ) Notice: Subject to any disclaimer, the term of this patent is extended or adjusted under 35 U.S.C. 154(b) by 178 days.

(21) Appl. No.: 17/909,335

(22) PCT Filed: Mar. 4, 2021

(86) PCT No.: PCT/DE2021/200031
§ 371 (c)(1),
(2) Date: Sep. 2, 2022

(87) PCT Pub. No.: WO2021/175389
PCT Pub. Date: Sep. 10, 2021

(65) Prior Publication Data
US 2023/0077893 A1    Mar. 16, 2023

(30) Foreign Application Priority Data

Mar. 6, 2020 (DE) .................... 10 2020 202 931.8

(51) Int. Cl.
*B65G 47/46* (2006.01)
*B65G 17/42* (2006.01)
*B65G 17/38* (2006.01)

(52) U.S. Cl.
CPC .............. *B65G 17/42* (2013.01); *B65G 17/38* (2013.01); *B65G 47/46* (2013.01)

(58) Field of Classification Search
CPC ......... B65G 17/38; B65G 17/42; B65G 47/46
(Continued)

(56) References Cited

U.S. PATENT DOCUMENTS 6,745,889 B2 * 6/2004 Beversdorf ............ B65G 17/42
                                                  198/377.02
7,284,654 B2 * 10/2007 Affaticati ............ B65G 47/962
                                                  198/370.04
(Continued)

FOREIGN PATENT DOCUMENTS

DE          103 60 289 A1    7/2005
DE    10 2015 002 185 A1    8/2016
(Continued)

OTHER PUBLICATIONS

International Search Report for Application No. PCT/DE2021/200031, dated Jun. 30, 2021, 2 pages.
(Continued)

*Primary Examiner* — Douglas A Hess
(74) *Attorney, Agent, or Firm* — Seed IP Law Group LLP

(57) ABSTRACT

A conveying carriage for a distributing conveyor, in particular a crossbelt sorter, which is configured to be conveyed along at least one guide element of the distributing conveyor in a conveying direction, includes a connecting arrangement for connecting the conveying carriage to a drive means of the distributing conveyor. With regard to a maximum freedom of movement of the conveying carriage relative to the drive means of the distributing conveyor, it is provided that the connecting arrangement has an articulated bearing.

9 Claims, 4 Drawing Sheets

(58) Field of Classification Search
USPC .................................................. 198/370.03
See application file for complete search history.

(56) References Cited

U.S. PATENT DOCUMENTS

| | | | |
|---|---|---|---|
| 9,154,016 B2* | 10/2015 | Chierego | B65G 47/962 |
| 10,099,860 B2* | 10/2018 | Droste | B65G 17/42 |
| 11,851,218 B1* | 12/2023 | Hoffman | B65G 47/248 |
| 2017/0341867 A1 | 11/2017 | Kaeser | |
| 2023/0227275 A1* | 7/2023 | Hauke et al. | |

FOREIGN PATENT DOCUMENTS

| | | |
|---|---|---|
| DE | 10 2015 004 787 B3 | 9/2016 |
| EP | 2 025 628 A2 | 2/2009 |

OTHER PUBLICATIONS

International Preliminary Report on Patentability and Written Opinion for Application No. PCT/DE2021/200031, dated Sep. 6, 2022, 6 pages.

\* cited by examiner

CONVEYING CARRIAGE FOR A DISTRIBUTING CONVEYOR AND CONNECTING ARRANGEMENT FOR FASTENING A CONVEYING CARRIAGE TO A DRIVE MEANS OF A DISTRIBUTING CONVEYOR

BACKGROUND

Technical Field

The disclosure relates to a conveying carriage for a distributing conveyor, in particular a crossbelt sorter, wherein the conveying carriage is configured to be conveyed along at least one guide element of the distributing conveyor in a conveying direction, wherein the conveying carriage comprises a connecting arrangement for connecting the conveying carriage to a drive means of the distributing conveyor.

Furthermore, the disclosure relates to a connecting arrangement for fastening a conveying carriage of a distributing conveyor to a drive means of the distributing conveyor.

Description of the Related Art

Sorting conveyors or distributing conveyors are piece goods sorting systems for "identifying piece goods arriving in a random order on the basis of predetermined distinguishing features and for distributing them to targets that are set according to the respective requirements" (see VDI Guideline 3619). Thereby, classification takes place in particular according to performance. The highest throughput, with more than 10,000 sorted goods per hour, is achieved, for example, by so-called crossbelt sorters.

The usual basic structure of the specified sorter comprises, as illustrated in FIG. 1, a sorting line 1, wherein successive discharge stations 2 (end points) and feeding stations (not shown) are arranged along such sorting line 1. Conveying carriages 3, often also referred to as carriers, are guided and driven in succession on the sorting line 1. In the case of transverse-belt sorters, the conveying carriages 3 have belt conveyors 4 that can be driven transversely to the conveying direction for feeding and discharging the sorted material, as shown by way of example in FIG. 1.

A distributing conveyor (also referred to below as a sorting conveyor) usually comprises a circumferential, closed conveying line, along which the carriers are transported. The carriers are generally connected to one another via coupling rods and thus form an endless chain of a plurality of conveying carriages. A motor, which transmits the energy to a conveying or drive means of the sorting conveyor, ensures the required driving force. As a rule, the conveying or drive means is designed as a continuous conveyor means in the form of a chain. Rubber block chains in particular are used as the chain. Each carrier is connected by a connection to the conveying or drive means of the sorting conveyor. Via this connection, the drive energy of the chain is transmitted to the carrier, so that the carrier is moved along the conveying line.

In practice, high demands are placed on the connecting component. On the one hand, the complete tensile force is transmitted to such component. On the other hand, further requirements result from the various driving situations of the carriers. Thus, the carriers have to negotiate curves and are also brought to different height levels via inclines. Accordingly, the connection must be realized such that the conveying carriage has sufficient freedom of movement relative to the drive means of the sorting conveyor (i.e., usually a rubber block chain).

Various articulated connecting components are already known from the prior art. For example, DE 10 2015 002 185 A1 describes a connecting component with a fastening element with two articulated parts connected in an articulated manner, wherein a first articulated part is connected in an articulated manner to the drive means, configured as a conveyor chain, of the sorting conveyor, while a second articulated part is connected to the conveying carriage. Accordingly, the first articulated part and the second articulated part are movable relative to the drive means, and at least the first articulated part is also movable relative to the conveying carriage.

However, the known fastening element is problematic in that it offers the conveying carriage only limited freedom of movement relative to the drive means. Particularly in special driving situations such as, for example, tight cornering or driving in regions in which the drive means is deflected, the freedom of movement proves to be insufficient to prevent stresses and to reduce mechanical stresses on the conveying carriage to a non-critical degree. In addition, the first articulated part is movably or rotatably fastened to the conveyor chain. However, movements of the first articulated part relative to the conveyor chain lead to increased wear of the conveyor chain.

BRIEF SUMMARY

Therefore, the present disclosure is directed to a conveying carriage for a distributing conveyor and a connecting arrangement for fastening a conveying carriage to a drive means of a distributing conveyor of the type mentioned at the outset in such a way that a greater freedom of movement of the conveying carriage relative to the drive means of the distributing conveyor is realized.

Disclosed herein is a conveying carriage for a distributing conveyor, wherein the conveying carriage comprises a connecting arrangement that has an articulated bearing.

Also disclosed is a connecting arrangement for fastening a conveying carriage of a distributing conveyor to a drive means of the distributing conveyor.

It has been recognized in a manner according with the present disclosure that a high degree of flexibility can be achieved by integrating an articulated bearing into the connecting arrangement of a conveying carriage. In particular, due to the specific properties of the articulated bearing, as a function of the specific installation location, mobility of the conveying carriage, relative to the drive means of the distributing conveyor, in several degrees of freedom, both linear degrees of freedom and rotational degrees of freedom can be achieved. Accordingly, the connection can ensure optimized driving behavior of the conveying carriage for different driving situations.

According to an advantageous embodiment, the articulated bearing is designed as a radial articulated bearing. As is known, this is a slide bearing, in which a sliding contact exists between a spherically-shaped inner ring and an outer ring having a hollow spherical inner shape. Due to the spherical shape of the sliding surfaces, a radial articulated bearing enables rotational, tilting, or pivoting movements, which can be transmitted to the conveying carriage when the radial articulated bearing is installed in the connecting arrangement. Thereby, the high load-bearing capacity of a radial articulated bearing and the suitability for precisely absorbing slow pivoting movements and thus compensating for compensatory movements between the conveying carriage and the drive means have proven to be particularly advantageous.

Thereby, the radial articulated bearing can be designed as a maintenance-requiring bearing, the individual parts of which must be separated from one another by an oil or lubricating film. In this embodiment, steel/steel sliding pairs are preferably used, wherein rolling bearing steel is preferred as the steel. Alternatively, the articulated bearing can also be designed as a maintenance-free, radial articulated bearing. Here, hard chrome/PTFE (polytetrafluoroethylene)- or chrome steel/PTFE-sliding pairings can be used, for example. Due to the special material composition, such articulated bearings require no re-lubrication, which proves to be advantageous particularly against the background of the relatively difficult-to-access installation location of the connecting arrangement below the conveying carriage.

According to an advantageous embodiment, the articulated bearing can be installed in an articulated housing, which for its part is fixedly connected to the drive means via a connecting element. In this way, a rigid connection is achieved on the drive means, i.e., there are no rotational or pivoting movements of a component of the connecting arrangement directly on the drive means. Accordingly, wear of the conveyor chain is minimized. In an advantageous manner, the connecting element is designed, for example, as a canted mounting link.

The use of a rubber block chain is suitable as the drive means of the distributing conveyor. This type of drive chain, in addition to being quiet, has the advantage of running without joints and being precisely determinable. With regard to an efficient transmission of the drive energy to the conveying carriage, it can be provided that the rubber block chain be designed such that it preferably has through holes formed at defined distances along the chain, which through holes can be used for coupling to the connecting arrangement by means of suitable bolt connections.

Preferably, these through holes can be oriented vertically when the rubber block chain is in an installed state. In this embodiment, a connecting element designed as a canted mounting link and coupled to the housing of the articulated bearing can be screwed to the chain with a canted section so as to virtually sit on the rubber block chain from above, thus realizing a connection with high tensile strength.

With regard to a further optimized mobility of the conveying carriage with respect to the drive means of the distributing conveyor, it can be provided that the articulated bearing be seated with an articulated bearing inner ring on a slide bolt that is at least indirectly fixedly connected to the conveying carriage. According to an advantageous embodiment, the articulated bearing and the slide bolt are designed in such a way that the slide bolt is oriented to be substantially horizontal and orthogonal to the conveying direction in an installation situation. In this way, a linear degree of freedom orthogonal to the conveying direction is achieved, whereby displacements of the conveying carriage perpendicular to the conveying direction can be compensated for.

Specifically, the slide bolt can be arranged between two lateral fastening elements that are rigidly connected to the conveying carriage. The lateral fastening elements are, advantageously, arranged at a distance from one another on both sides of a central axis of the distributing conveyor, wherein the distance between the fastening elements defines a lateral play for the articulated bearing on the slide bolt.

According to a further advantageous embodiment, the connecting arrangement is configured such that, in a neutral position of the articulated bearing on the slide bolt, the central axis of the conveying carriage, the central axis of the articulated bearing, and the neutral axis of the drive means of the distributing conveyor (in particular, a rubber block chain) are aligned with one another. In this way, a particularly stable and quiet running of the conveying carriage, with a maximum movability on both sides of the central axis of the distributing conveyor, is ensured.

BRIEF DESCRIPTION OF THE DRAWINGS

There are various possibilities for designing and developing the teaching of the present disclosure in an advantageous manner. In this regard, reference is made, on the one hand, to the dependent patent claims and, on the other, to the following explanation of preferred embodiments of the disclosure based upon the drawing. Generally preferred designs and developments of the teaching are also explained in conjunction with the explanation of the preferred exemplary embodiments of the disclosure with reference to the drawings. Illustrated are the following:

In the figures, unless otherwise indicated, the same reference signs denote the same components or parts.

DETAILED DESCRIPTION

Figure 1:
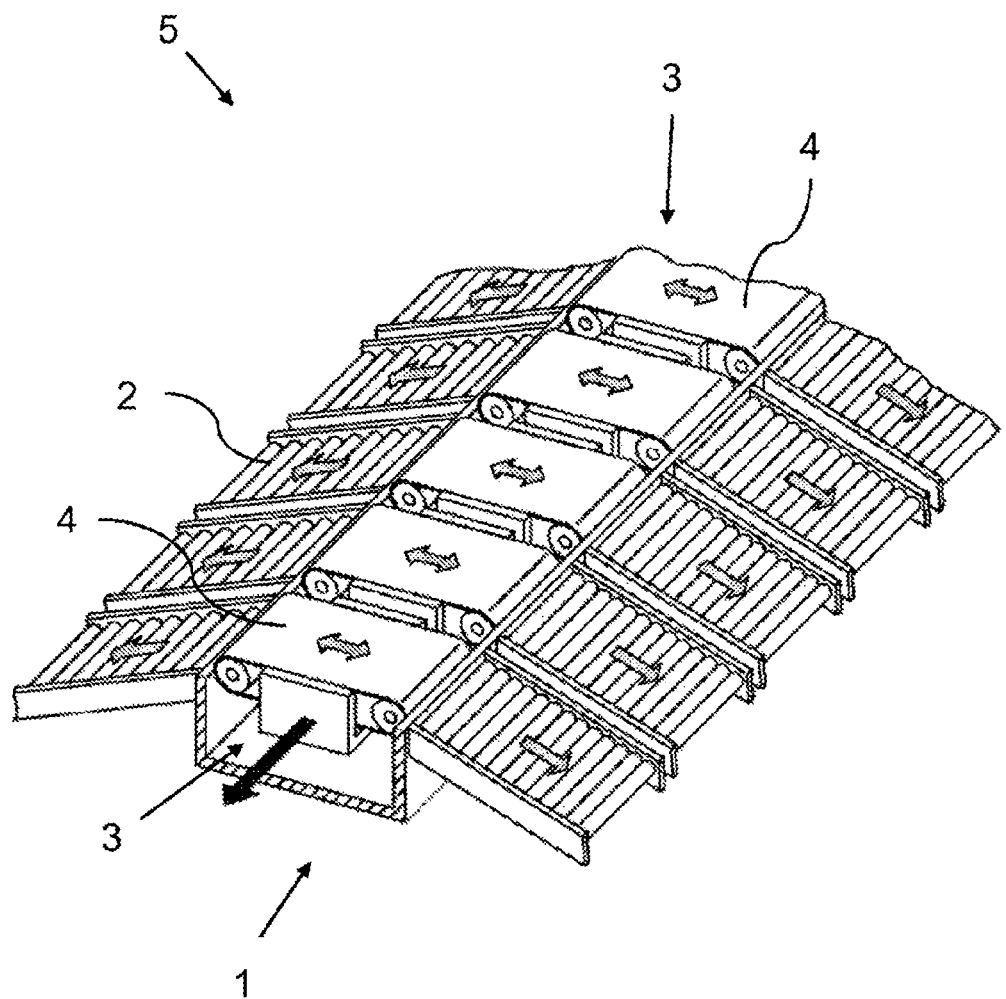
FIG. 1 is a schematic illustration of the general structure of a transverse-belt sorter according to the prior art.
Figure 2:
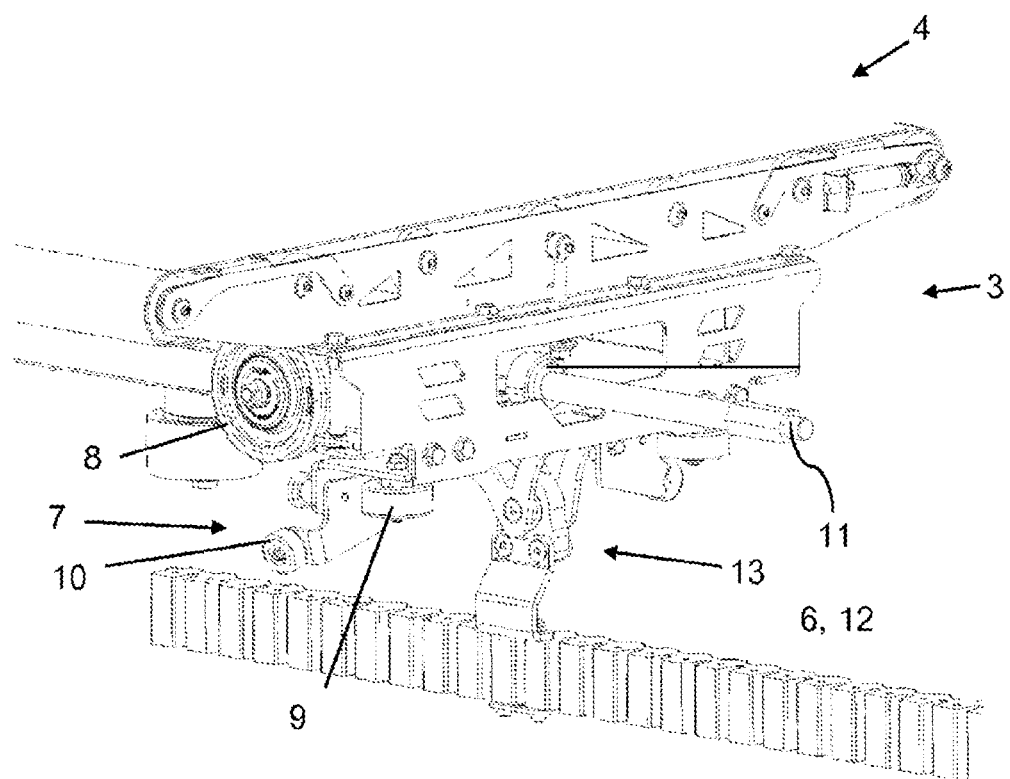
FIG. 2 shows, in a perspective illustration, an installation location of a conveying carriage in a sorting installation with a connection to a drive means according to an exemplary embodiment of the present disclosure.

FIG. 2 shows a perspective view of an installation location of a conveying carriage 3 in a distributing conveyor 5 (hereafter also referred to as a sorting conveyor or sorting installation), with a connection to a drive means 6 of the distributing conveyor 5 according to an exemplary embodiment of the disclosure. Thereby, the entire sorting installation 5 comprises a plurality of conveying carriages 3, which are coupled to one another and usually form an endless chain.

As can be seen in FIG. 2, each conveying carriage 3 (hereafter also referred to as a carrier) comprises one roller assembly 7 per side, which roller assembly is in turn constructed from a total of three rollers. The guide of the carrier 3 forms tubes (not shown in FIG. 2 for reasons of clarity) on which an upper-lying running roller 8 of the roller assembly 7 rolls, and a side guide roller 9 and a bottom support roller 10 hold the carrier 3 in position. A coupling rod 11, which is located at the rear end of each carrier 3 when viewed in the conveying direction, forms the connecting element between the carriers 3. As a result, the entire sorter forms an endless chain of several conveying carriages 3. While one end of the coupling rod 11 is fixedly connected to the respective conveying carriage 3, the other end piece is mounted in an articulated manner. This arrangement enables travel along gradients and curves.

A motor, which transmits the energy to the drive means 6 in the form of a rubber block chain 12, ensures the required driving force. The carriers 3 are connected to this rubber block chain 12 by an articulated connecting arrangement 13 and are, accordingly, set in motion by the rubber block chain 12. In other words, the drive energy of the rubber block chain 12 is transmitted via the connecting arrangement 13 to the respective carrier 3. Thereby, the entire tensile force of the rubber block chain 12 is transmitted to the connecting arrangement 13.

Figure 3:
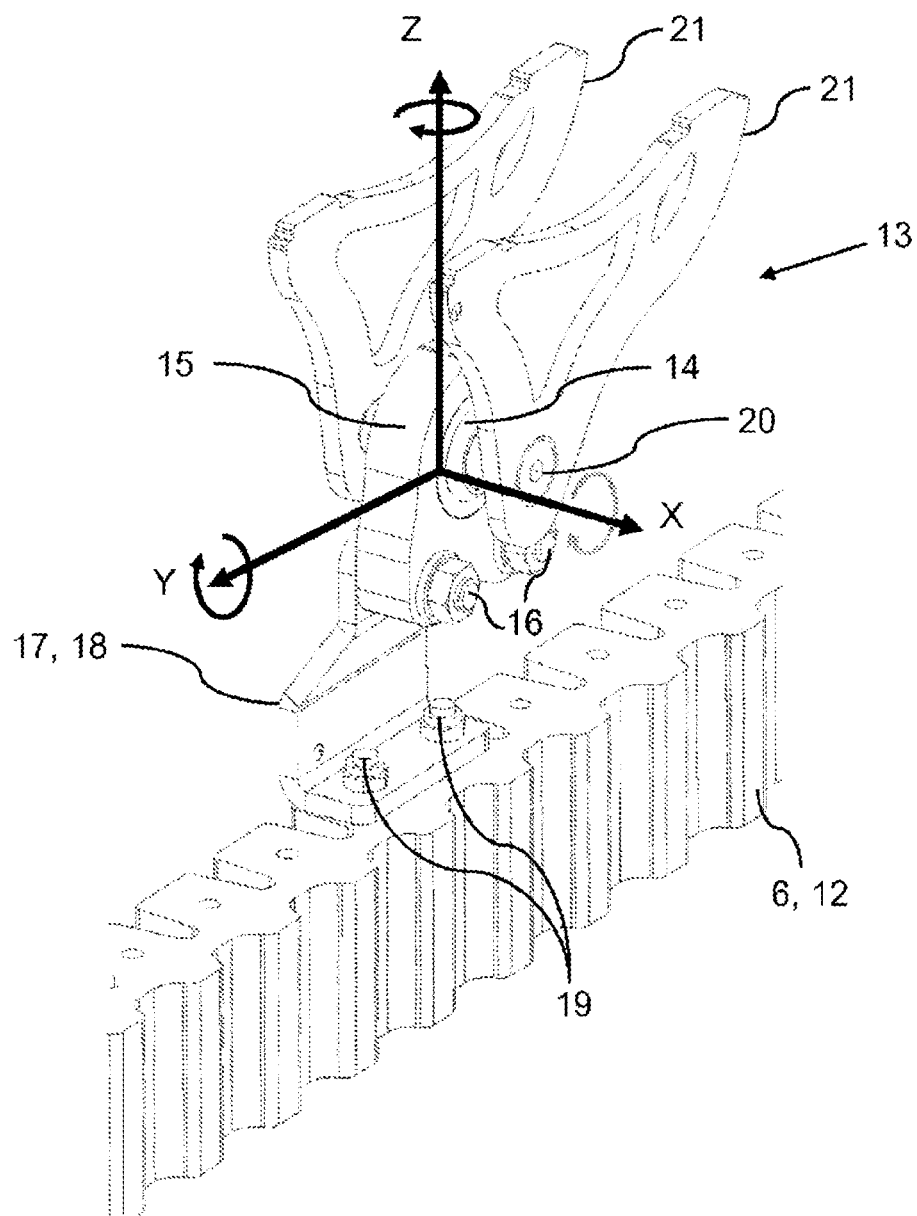
FIG. 3 shows, in a perspective illustration, a connecting arrangement of a conveying carriage attached to a drive means according to an exemplary embodiment of the present disclosure.

FIG. 3 shows an enlarged view of the connecting arrangement 13 of the conveying carriage 3 according to FIG. 2. According to the present disclosure, the connecting arrangement 13 comprises an articulated bearing 14, wherein, according to the illustration in FIG. 3, this can be designed as a radial articulated bearing. By integrating an articulated bearing 14 into the connecting arrangement 13, a mobility of the conveying carriage 3 relative to the drive chain 12 can be realized in several degrees of freedom, as will be described in detail below. In particular, the connection according to embodiments of the disclosure meets special requirements that arise from different driving situations of a sorter. In this connection, it is essential that the carriers 3 also have to manage movements to different height levels in addition to cornering. As a result of the provision according to the disclosure of an articulated bearing 14, the connecting arrangement 13 can be configured in such a way that it has all the degrees of freedom necessary for this purpose, without thereby forming significant stresses on the conveying carriage 3.

According to the exemplary embodiment illustrated in FIG. 3, the articulated bearing 14 is installed in a housing 15, which is rigidly connected to a connecting element 17 on a lower section via two screw connections 16. The connecting element 17, in turn, which is designed as a mounting link 18 canted in a lower region, is fixedly connected to the rubber block chain 12 via two bolt connections 19.

As can also be seen in FIG. 3, the connecting arrangement 13 comprises a slide bolt 20, which is guided through the inner ring of the articulated bearing 14 with an orientation that is substantially horizontal and transverse to the conveying direction. The two ends of the slide bolt 20 are each rigidly coupled to lateral fastening elements 21. The fastening elements 21 extend upwards beyond the articulated bearing 14 and are fixedly connected (not shown) to a suitable receptacle on the underside of the conveying carriage 3 in a manner known per se—for example, by means of screw connections.

The coordinate system illustrated in FIG. 3 is used as a basis for the following description of the functioning of the connecting arrangement 13, and especially of the articulated bearing 14. According to this, a horizontal plane is spanned by the x- and the y-axes, wherein the x-axis is orthogonal and the y-axis is parallel to the conveying direction. The z-axis describes a vertical.

The articulated bearing 14 installed in the housing 15 initially enables the conveying carriage 3 to rotate about the z-axis. These rotations about the z-axis are required for the cornering of the conveying carriage 3.

In practice, the rubber block chain 12 must be deflected by deflecting rollers that are fastened to a frame of the sorting conveyor 5. As a result, the rubber block chain 12 experiences a polygon effect, whereas the conveying carriages 3 travel an approximately optimal radius within a curve. The resulting offset between conveying carriage 3 and rubber block chain 12 can likewise be compensated for by the connecting arrangement 13 according to embodiments of the present disclosure. Specifically, this takes place via a linear displacement of the articulated bearing 14 in the direction of the x-axis. This movement is realized via the kinematics of the connection 13. As already described above, a slide bolt 20 is located within the inner ring of the articulated bearing 14, which slide bolt is in turn fixedly connected to the conveying carriage 3—for example, via the above-mentioned lateral fastening elements 21. The length of the slide bolt 20 is greater by a certain amount than the width of the articulated bearing 14 (seen in the x-direction), thus enabling the displacement.

In addition to compensating for the polygon effect of the rubber block chain 12, the linear degree of freedom in the x-direction is also always required, if the carrier 3 undergoes a displacement perpendicular to the conveying direction. Exemplary scenarios for this purpose are the introduction and discharge process or in the region of the drive.

The travel to another height level, whether via a straight line slope or via a coil slope, requires the rotational degrees of freedom around the x-, y-, and z-axes. According to embodiments of the present disclosure, all three rotations can also be realized via the articulated bearing 13, as indicated by the rotating arrows in FIG. 3.

Figure 4:
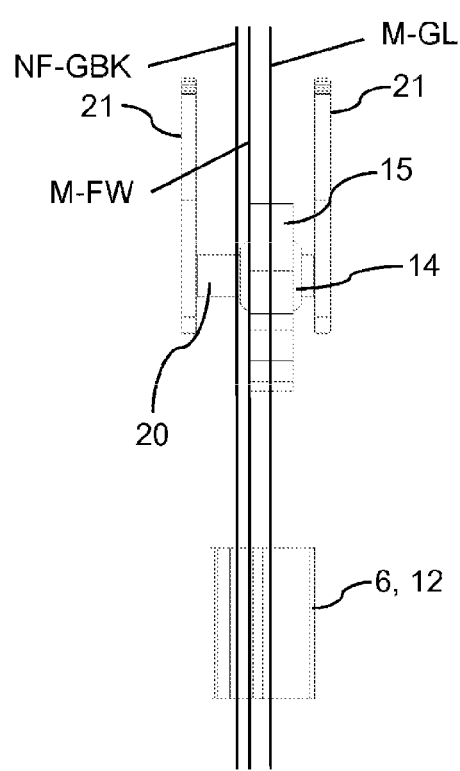
FIG. 4 shows, in a schematic view, the individual axes of a connecting arrangement according to an exemplary embodiment of the present disclosure.

FIG. 4 shows a schematic view of the relevant axes of a connecting arrangement 13 according to an exemplary embodiment of the present disclosure. This is, on the one hand, the central axis M-FW of the conveying carriage 3 (viewed in the conveying direction). The central axis M-GL of the articulated bearing 14 and the neutral axis NF-GBK of the rubber block chain 12 are also relevant. According to a preferred embodiment of the disclosure, illustrated in FIG. 5, the connecting arrangement 13 is configured such that all of the specified axes align with one another in a neutral starting position of the articulated bearing 14. The neutral starting position of the articulated bearing 14 can be defined by a central positioning of the articulated bearing 14 on the slide bolt 20.

Figure 5:
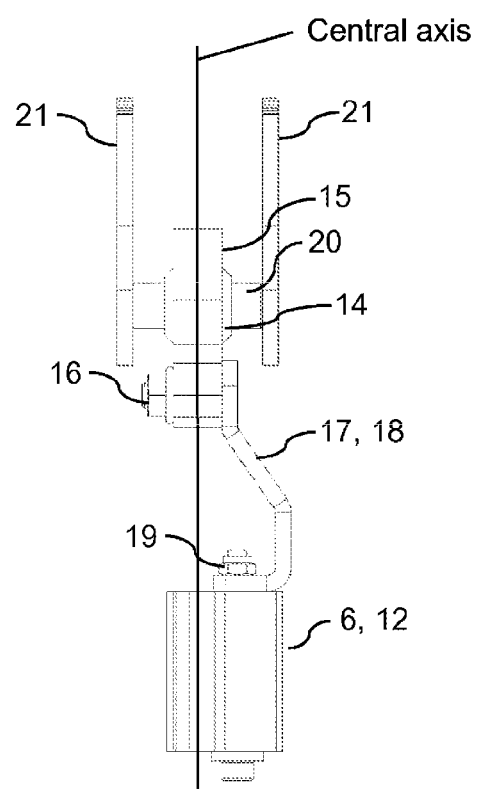
FIG. 5 shows, in a schematic view, a connecting arrangement with an aligned central axis according to an exemplary embodiment of the present disclosure.

The aligned arrangement is achieved by a specific configuration of the connecting element 17, which connects the articulated housing 15 to the rubber block chain 12. As can be seen in FIG. 5, this connecting element 17 is designed as a canted mounting link 18, wherein a canted lower section of the mounting link 18 is seated on the rubber block chain 12 and is connected to the rubber block chain 12 via two or more bolts 19. Thereby, the bolts 19 are guided from above through through holes formed at regular intervals in the rubber block chain 12 and screwed from below. Both the articulation central axis, the neutral axis of the rubber block chain 12, and the central axis of the conveying carriage 3 are aligned with one another by the canting on the mounting link 18. The aligned configuration ensures maximum mobility of the conveying carriage 3 on both sides of the central axis of the distributing conveyor 5.

With regard to other advantageous embodiments of the device according to the present disclosure, to avoid repetition, reference is made to the general part of the description and also to the accompanying claims.

Finally, it is expressly pointed out that the exemplary embodiments described above of the device according to the disclosure serve only to explain the claimed teaching, but do not limit it to the exemplary embodiments.

LIST OF REFERENCE SIGNS

1 Sorting line
2 Feeding station (end point)
3 Conveying carriage

4 Belt conveyor
5 Distributing conveyor
6 Drive means
7 Roller assembly
8 Running roller
9 Lateral guide roller
10 Lower support roller
11 Coupling rod
12 Rubber block chain
13 Connecting arrangement
14 Articulated bearing
15 Housing
16 Screw connection
17 Connecting element
18 Mounting link
19 Bolt connection
20 Slide bolt
21 Fastening element
M-FW Central axis of conveying carriages
M-GL Central axis of articulated bearings
NF-GBK Neutral axis of rubber block chain The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A conveying carriage for a distributing conveyor, wherein the conveying carriage is configured to be conveyed along at least one guide element of the distributing conveyor in a conveying direction, the conveying carriage comprising:
a connecting arrangement for connecting the conveying carriage to a drive means of the distributing conveyor, wherein:
the connecting arrangement has an articulated bearing,
the articulated bearing is seated with an articulated bearing inner ring on a slide bolt that is at least indirectly fixedly connected to the conveying carriage,
the articulated bearing has lateral play on the slide bolt, and
the connecting arrangement is configured such that, in a neutral position of the articulated bearing on the slide bolt, a central axis of the conveying carriage, a central axis of the articulated bearing, and a neutral axis of the drive means of the distributing conveyor are aligned with one another.

2. The conveying carriage according to claim 1, wherein the articulated bearing is a radial articulated bearing.

3. The conveying carriage according to claim 1, wherein the articulated bearing is installed in an articulated housing that is fixedly connected to the drive means of the distributing conveyor via a connecting element.

4. The conveying carriage according to claim 3, wherein the connecting element is a canted mounting link.

5. The conveying carriage according to claim 3, wherein the drive means of the distributing conveyor comprises a rubber block chain with through holes extending in a vertical orientation in an installed state of the rubber block chain, and wherein the connecting element is connected to the rubber block chain by at least one bolt guided through one of the through holes of the rubber block chain.

6. The conveying carriage according to claim 1, wherein the slide bolt is arranged between two lateral fastening elements that are fixedly connected to the conveying carriage.

7. A connecting arrangement for fastening a conveying carriage of a distributing conveyor according to claim 1 on a drive means of the distributing conveyor, the connecting arrangement comprising:
an articulated bearing that is seated with an articulated bearing inner ring on a slide bolt that is at least indirectly fixedly connected to the conveying carriage,
wherein the articulated bearing has lateral play on the slide bolt, and the connecting arrangement is configured such that, in a neutral position of the articulated bearing on the slide bolt, a central axis of the conveying carriage, a central axis of the articulated bearing, and a neutral axis of the drive means of the distributing conveyor are aligned with one another.

8. The conveying carriage according to claim 1, wherein the distributing conveyor is a crossbelt sorter.

9. The conveying carriage according to claim 1, wherein the articulated bearing is a maintenance-free radial articulated bearing.

* * * * *